US008620330B2

(12) United States Patent
Duran et al.

(10) Patent No.: US 8,620,330 B2
(45) Date of Patent: Dec. 31, 2013

(54) RELAY OF DELAYED TRANSMITTER IDENTITY ACROSS AN AUDIO PATCH

(75) Inventors: James C. Duran, Palatine, IL (US); John W. Maher, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 593 days.

(21) Appl. No.: 12/423,105

(22) Filed: Apr. 14, 2009

(65) Prior Publication Data

US 2010/0261477 A1    Oct. 14, 2010

(51) Int. Cl.
*H04W 40/00* (2009.01)
(52) U.S. Cl.
USPC .............. 455/445; 455/422.1; 455/550.1; 455/560; 370/328; 370/338
(58) Field of Classification Search
USPC .................................. 455/445, 518
See application file for complete search history.

(56) References Cited

U.S. PATENT DOCUMENTS

| | | | |
|---|---|---|---|
| 6,647,020 B1 | 11/2003 | Maher | |
| 7,822,035 B2 * | 10/2010 | Mutikainen et al. | 370/392 |
| 2006/0121926 A1 | 6/2006 | Joung | |
| 2006/0223459 A1 * | 10/2006 | Maggenti | 455/90.2 |
| 2007/0021131 A1 * | 1/2007 | Laumen et al. | 455/518 |
| 2007/0050510 A1 * | 3/2007 | Jiang | 709/227 |
| 2007/0197250 A1 * | 8/2007 | Kies et al. | 455/518 |
| 2007/0242670 A1 * | 10/2007 | Simonson et al. | 370/390 |
| 2008/0026703 A1 * | 1/2008 | Chakraborty et al. | 455/90.2 |
| 2010/0238911 A1 * | 9/2010 | Michalson et al. | 370/338 |

FOREIGN PATENT DOCUMENTS

| | | |
|---|---|---|
| GB | 2429604 A | 2/2007 |
| WO | 0069189 A1 | 11/2000 |
| WO | 2006105337 A2 | 10/2006 |

OTHER PUBLICATIONS

Generic Astro 25 Network Overview; Sep. 2008.
MCC 7500 Console Audio Patch; ASTRO 25 System Release A7.6 Overview; Mar. 2009.
MCC 7500 Console presentation at APCO 2008, Aug. 2008.
MCC 7500 Dispatch Console Subsystem System Release 7.6 User Manual; p. 1-1 to 1-3; 1-11, 2-1 to 2-24; Dec. 2008.
PCT Internationalsearch Report Dated July 15, 2010.
International Preliminary Report on Patentability and Written Opinion for International Application Number PCT/US2010/028569 mailed on Oct. 27, 2011.

* cited by examiner

*Primary Examiner* — Liton Miah
(74) *Attorney, Agent, or Firm* — Anthony P. Curtis; Randi L. Karpinia; Kenneth A. Haas

(57) ABSTRACT

A communication system, console, and method of patching a PTT call are provided. An audio stream and control messages are provided to the console, which patches the either or both to target devices. The identity of the audio stream source is embedded only in the audio stream. Initially, when the audio stream is first patched, the identity is not provided. While the audio stream is being patched, the identity is extracted and the control messages updated so that the identity is immediately relayed through the console without having to wait for the next periodic transmission of a control message from the console.

10 Claims, 7 Drawing Sheets

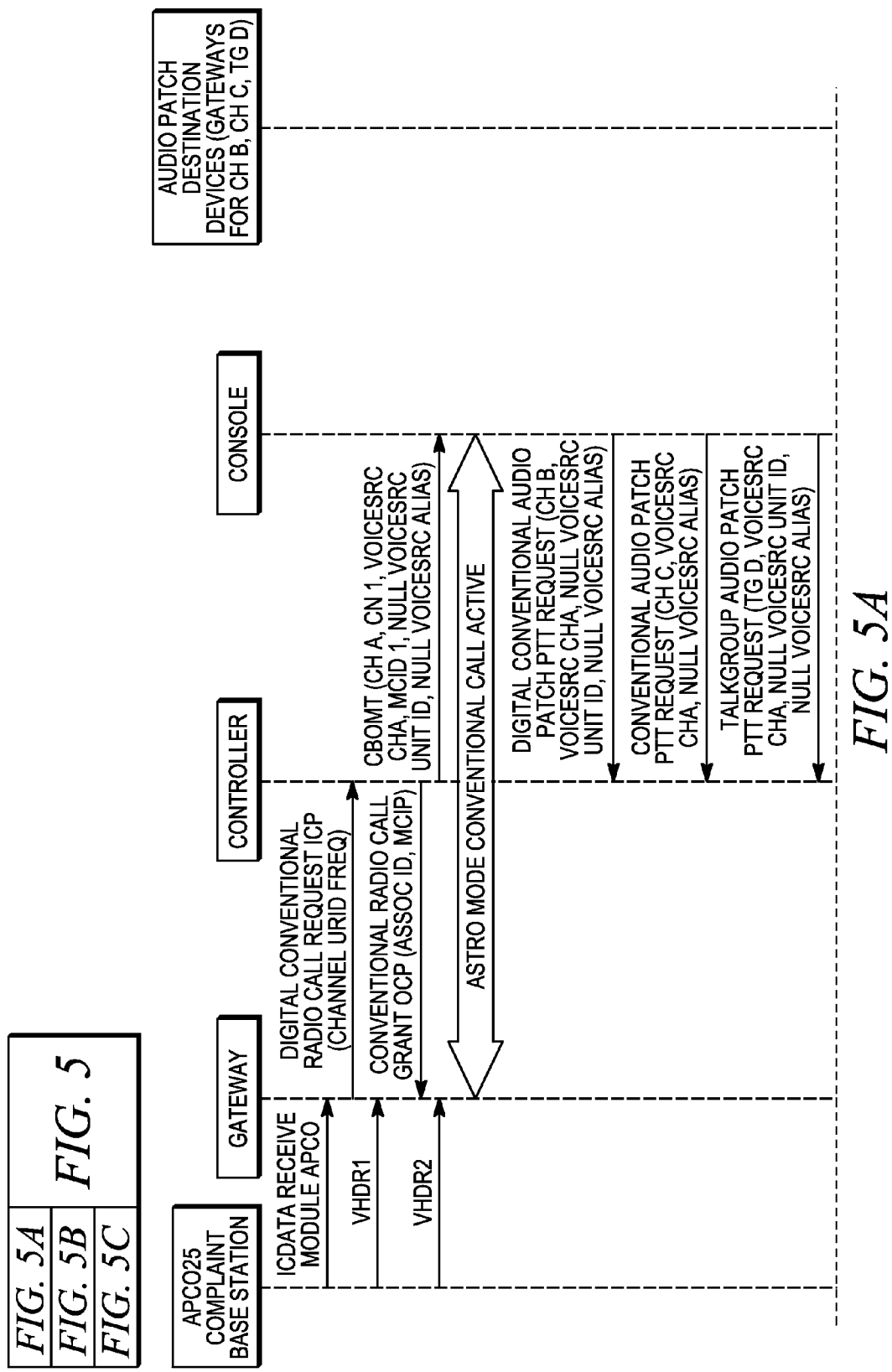

RELAY OF DELAYED TRANSMITTER IDENTITY ACROSS AN AUDIO PATCH

TECHNICAL FIELD

This application is related to audio patches and, in particular, the relay of a transmitter's identity across an audio patch.

BACKGROUND

Wireless communication systems, for example cellular telephony or private mobile radio communication systems, typically provide for radio telecommunication links to be arranged between a plurality of end devices via a system infrastructure having fixed installations including one or more base transceiver stations (base stations).

In many public service environments, the end devices communicate through digital push-to-talk (PTT) connections. Different types of PTT connections are used, depending on the standard(s) supported by the devices and network. These connection types include direct communication between the end devices, in which system infrastructure is not used, or indirect communication between the end devices, in which the system infrastructure is employed. A variety of modes may be used in each of these communications types, which include conventional over-the-air (OTA) device-to-device communication or trunked communication in which a multicast (talk) group is initially established and then transmissions sent to all end devices that are members of the talk-group.

In infrastructure-based PTT communications, the call from the transmitting end device (hereinafter referred to as the transmitter) is transmitted to the base station servicing the transmitter. This call is subsequently patched through a console to receiving end devices (hereinafter referred to as the receivers). The call from the transmitter operating using one type of communication (e.g., digital) may be patched through to one or more of the same or different communication types (e.g., digital, analog, trunked) by the console.

It is desirable for the receivers in a patched call, as well as other listening devices listening into the call (either audio or control information provided by the console), to be able to obtain the transmitter identity. Consoles have not previously had the capability to supply the transmitter identity when providing an audio patch, for example, to a trunking site controller where the control channel requires the identity of the transmitter (such as when using the APCO Project 25 (P25) Trunking CAI standard protocol). Accordingly, it would be desirable for the console to provide transmitter identity to the various target devices being supplied with call information when patching calls.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present application.

Figure 1:
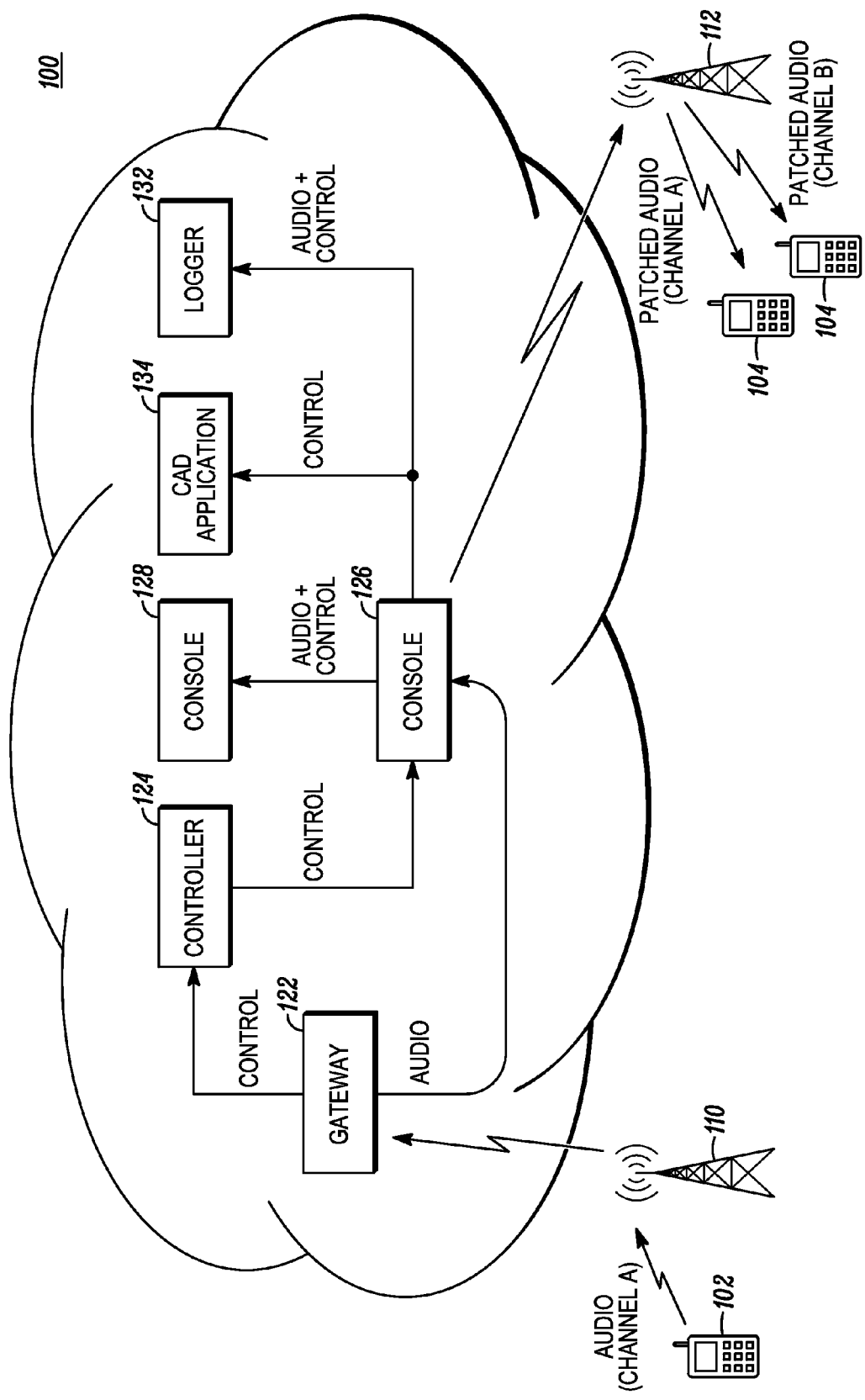
FIG. 1 illustrates a block diagram of an embodiment of a system having a console that patches a call from an audio source to a number of different target destinations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF PREFERRED EMBODIMENTS

The following detailed description is merely exemplary in nature and is not intended to limit the invention defined by the claims or the application and uses of such invention. Furthermore, there is no intention to be bound by any expressed or implied theory presented in the preceding technical field, background, brief summary or the following detailed description. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, again which is defined by the claims.

Before describing in detail the embodiments, it should be observed that the embodiments reside primarily in combinations of method steps and apparatus components related to a system containing a console that patches an audio stream and provides the identity of the audio source (transmitter) to target devices (receivers and listeners) when the identity is delayed. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Referring to FIG. 1, a system according to one embodiment is illustrated. In the system 100, a transmitter 102 initiates a call that is eventually received by the receivers 104. The transmitter 102 sends audio plane information, which includes encoded audio (also called an audio stream) and control information, and control plane information, which includes signaling information, to the infrastructure. The P25 standard protocols (found, e.g., at http://www.apcointl.org/frequency/project25, http://www.project25.org/, http://www.p25.com/resources/P25TrainingGuide.pdf) are examples of such audio and control information. The infrastructure includes base stations 110 and other device in the network 120. Although many different elements (such as repeaters) may be present in the network 120, only some of these are shown for convenience. The base station 110 receives the audio stream and forwards it to the network 120. The audio plane information and control plane information is provided using different protocols.

In the network 120, the audio and control plane information is provided to a gateway 122, which forwards the call control information to a controller 124. The controller 124 controls resources for the call, transmitting to a console 126 performing the audio patch a control message indicating that audio for the console 126 is available on a particular channel. The controller 124 also provides a response to the gateway 122 granting authorization to transmit. The console 126, in turn, can request additional allocation for the patch from the controller 124 (although this functionality can be embedded in the controller itself). The console 126, after having received the control information from the controller 124, receives the audio stream from the gateway 122. In other embodiments, the functions of the gateway 122 and controller 124 may performed by the console 126 alone.

The console 126 provides audio and/or control information to target devices (receivers, listeners, non-listeners as below). More specifically, the console 126 patches the audio stream from the transmitter 102 on one channel to outgoing audio streams on various channels or talkgroups listened to by various listeners 128, 134 in the network 120, as well as the receivers 104. To avoid possible confusion, the term "patch" is used herein to denote audio or control information that is provided by the console 126 and that is of a call received by the console 126 to the target devices. Thus, the console 126 also patches control information of the call (such as the transmitter identity and other information contained within the header and audio payload) to non-listeners 132 (which do not receive the audio) as well as listeners 128, 134. As illustrated in FIG. 1, listeners include a logging recorder/logger 132, which is used for later playback of the audio, another console 128. Non-listeners include a Computer Aided Dispatch (CAD) Application 134 in the network 120.

The console 126 patches the audio received to multiple receivers that may operate under different modes and use different protocols. For example, the call from the transmitter 102 may use the CAI (Common Air Interface) P25 standard protocol, while the receivers 104 may receive messages using protocols such as the various P25 protocols (e.g., CAI P25 standard protocol, trunking P25 standard protocol), TETRA, or iDen. Note that the above list is not exclusive, but merely illustrative of the types of messages between which the console 126 can translate the audio and control information.

Figure 2:
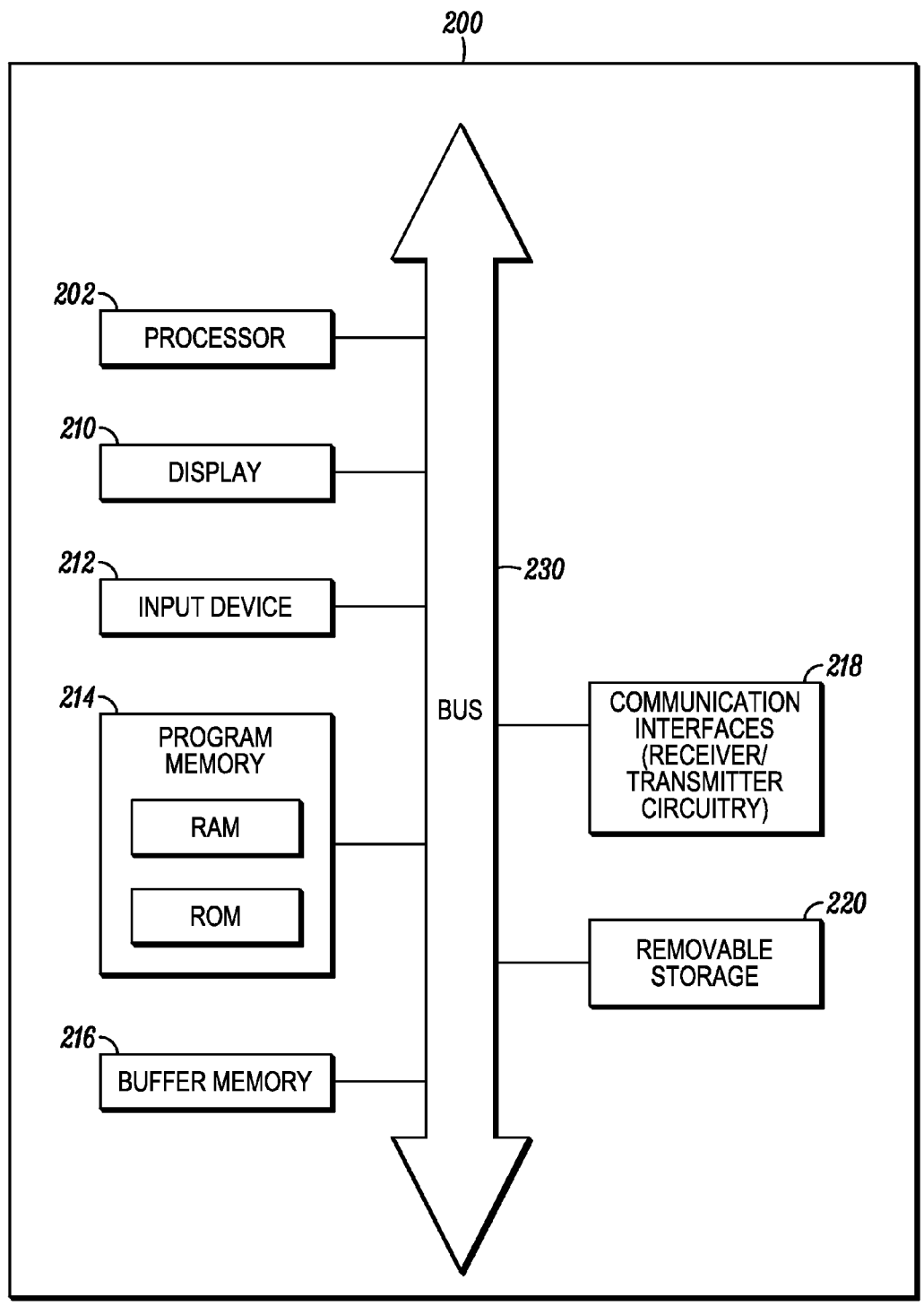
FIG. 2 illustrates a block diagram of an embodiment of a console.

Referring to FIG. 2, a block diagram of an exemplary console 200 is illustrated. The console 200 is typically a server or other computing device configured and operated locally or remotely by a dispatcher who may also be in communication with the transmitter and/or receivers. The console 200 contains, among other components, a processor 202, a transceiver 204 including transmitter circuitry 206 and receiver circuitry 208, a display 210, an input device(s) 212, a program memory 214 for storing operating instructions that are executed by the processor 202, a buffer memory 216, one or more communication interfaces 218, and a removable storage 220.

The console 200 is preferably a server or other integrated unit containing at least all the elements depicted in FIG. 2, as well as any other elements necessary for the console 200 to perform its particular electronic function, all connected by a bus 230. Alternatively, the console 200 may comprise a collection of appropriately interconnected units or devices, in which such units or devices perform functions that are equivalent to the functions performed by the elements of the console 200.

The processor 202 is used for a variety of functions, such as vocoding the call and translating the call from the source protocol (e.g. CAI P25 protocol) to the target protocols, and preferably includes one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) and/or read only memory (ROM), a hard disk drive, a compact disk (CD) ROM, a digital video disk (DVD), a high density (HD) disk, a flash memory card or any other medium for storing digital information. One of ordinary skill in the art will recognize that when the processor 202 has one or more of its functions performed by a state machine and/or logic circuitry, the memory 214 containing the corresponding operational instructions. The operations performed by the processor 202 may include encoding, decoding, transcoding, audio summing, echo cancellation, and audio level control, for example.

The buffer memory 216 may be any form of volatile memory, such as RAM, and is used for temporarily storing received information packets. The display 210 may be an LCD, CRT, or any other known display. The input device 212 used by a dispatcher local to the console 200 to operate the console 200 may be one or more of: an alpha-numeric keyboard, isolated buttons, soft and/or hard keys, touch screen, jog wheel, or any other known input device. The console 200 also includes a communication interface 218 that includes conventional circuitry to enable digital transmissions over a communication channel using, for example IP/Ethernet LANs.

The receiver 104 shown in FIG. 1 is typically a handheld mobile device such as a Professional Mobile radio (PMR), cellular telephone, personal digital assistant (PDA), push-to-talk (PTT) radio, or wireless laptop computer. However, the receiver 104 can be vehicle mounted or fixed to a particular geographic location. The receiver 104 may have fewer, the same, or a greater number of features of the console 200.

Turning to the communications, it is generally desirable to minimize the audio delay provided by the transmitter 102. Reducing audio delay becomes increasingly important in Mission Critical devices used by emergency responders (e.g., police, fire, medical, military). It is also desirable to provide the transmitter identity to the receivers 104, as well as the listening devices (as shown the other console 128, the logger 132, and the CAD 134). When a trunked call, such as that using the trunking P25 standard protocol, is initiated by the transmitter 102, all of the control information, including the identity of the transmitter 102, is provided by the transmitter 102 in the initial call setup per the protocol established for trunked communications. This identity is then provided through the audio patch to all of the devices connected to the console 126. However, providing the transmitter identity for conventional OTA PTT communications such as those using the CAI P25 standard protocol is more problematic as the information of the transmitter identity is not available until after the audio has begun to be patched.

More specifically, under layer 2 OSI protocol, the audio and control information in a call using the P25 standard protocol are embedded in the same flow. The control information is used to establish and maintain the call between devices. The control information and audio are provided in a header and a superframe. The header includes control information of the call, such as the type of call (voice, group, or signaling) and security information. The header, however, does not contain the identity of the transmitter. This information is instead included in the superframe. The superframe is 360 ms long and is formed from eighteen frames of 20 ms in which the audio is embedded. Also embedded in these frames is a portion of the control information. The first nine frames contain one set of control information (link control one—

LC1) and the second nine frames contain another set of control information (link control two—LC2). LC1 contains the identity of the transmitter. The control information of the identity of the transmitter is contained in several of the frames (specifically, frames 5-8) of LC1. Thus, in the embodiment described, the first eight frames are received and decoded to determine the identity of the transmitter. In other protocols, the placement of the transmitter identity in the call may differ, and thus the description may change accordingly.

Under P25 standard conventional signaling, the transmitter identity follows the initial call activation by about 260 ms. More specifically, the gateway 122 clocks in information from the base station 110 at a rate determined by the infrastructure. The header, which consists of two parts and is about 40 ms long, is clocked in first. After sending the header to the console 126, the gateway 122 then accumulates three frames (60 ms) at a time before passing them to the console 126 via the channel. The gateway 122 also stores the frames and, after accumulating at least the first eight frames, decodes the information in the frames. Once the frames are decoded, the transmitter identity contained in LC1 is extracted and provided to the console 126. The minimum amount of time (best case scenario) between reception of the call from the base station 110 and determination of the identity is about 241 ms (as shown in Table 1), assuming processing/decoding time is negligible. This time increases dramatically if the transmitter 102 is in an area of poor coverage or there is interference so that one of the LC1 frames is corrupted or lost, or if the base station 110 servicing the transmitter 102 enters the superframe late. In either case, the audio frames in the next superframe are used to determine the identity. In a worst case scenario in which the first frame is lost/corrupted or the base station enters the superframe during the first frame, it will take another 360 ms. Thus, it can take up to about the length of two superframes (620 ms) before the transmitter identity is determined by the gateway 122 provided to the console 126, and provided to the receivers 104 and listeners 128, 132, 134.

As above however, even though the transmitter identity is not available to the console, in certain situations the audio is provided by the console to the receivers and listeners to minimize delays introduced by the console. This means that the console cannot relay the transmitter identity before the first frame of audio is relayed and thus the transmitter identity is not available to the various target devices at the onset of the call.

Moreover, listeners who only receive control plane information from the console may experience substantially longer delays in matching the transmitter identity to the audio. Even though the control plane information is transmitted to the console prior to the audio, as above the CAI P25 standard control information in the header does not contain the identity. Thus, the transmitter identity is obtained only after all of the audio frames containing the transmitter identity are decoded, sent to the console out of band, and then provided by the console in the appropriate control plane information for the particular device(s) (non-listener(s)) on the control plane channel. Although this control plane information is periodically retransmitted, the length of time can be problematic. Generally, the control plane information is periodically repeated between the gateway 122, controller 124 and console 126 after a substantial amount of time, e.g., every 30 s, to establish that the call remains alive. This means that such non-listeners will not be able to determine the origination of the call for about 30 s before the transmitter identity is matched to the call. Further complicating this, a substantial percentage (if not a majority) of PTT transmissions are completed in under 30 s. Thus, under these conditions, the non-listeners may never obtain the transmitter identity for a particular call, merely registering that a call was made.

Figure 3:
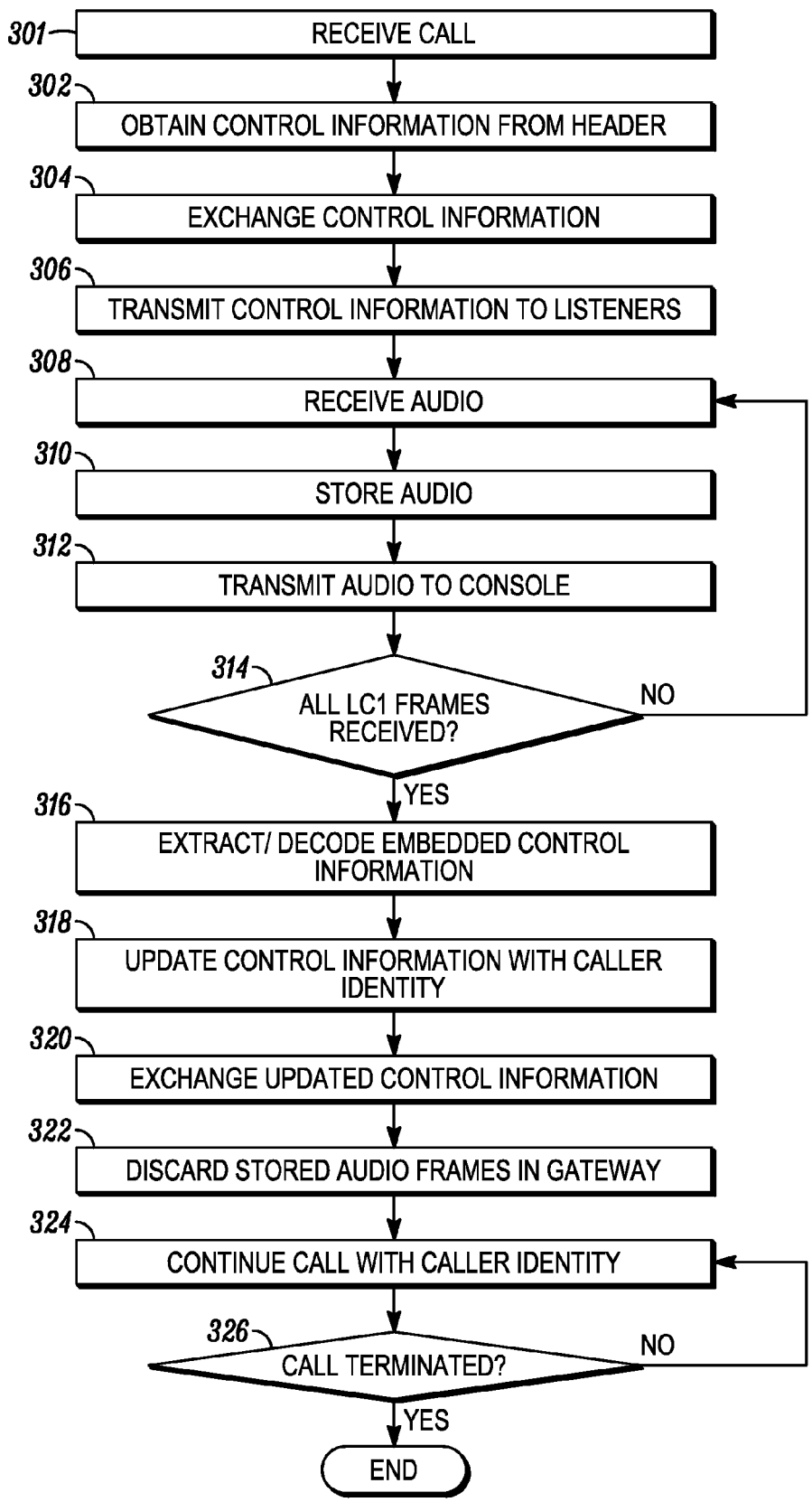
FIG. 3 illustrates a flow chart of a method used by a gateway and controller for providing transmitter identity in a patched communication.
Figure 4:
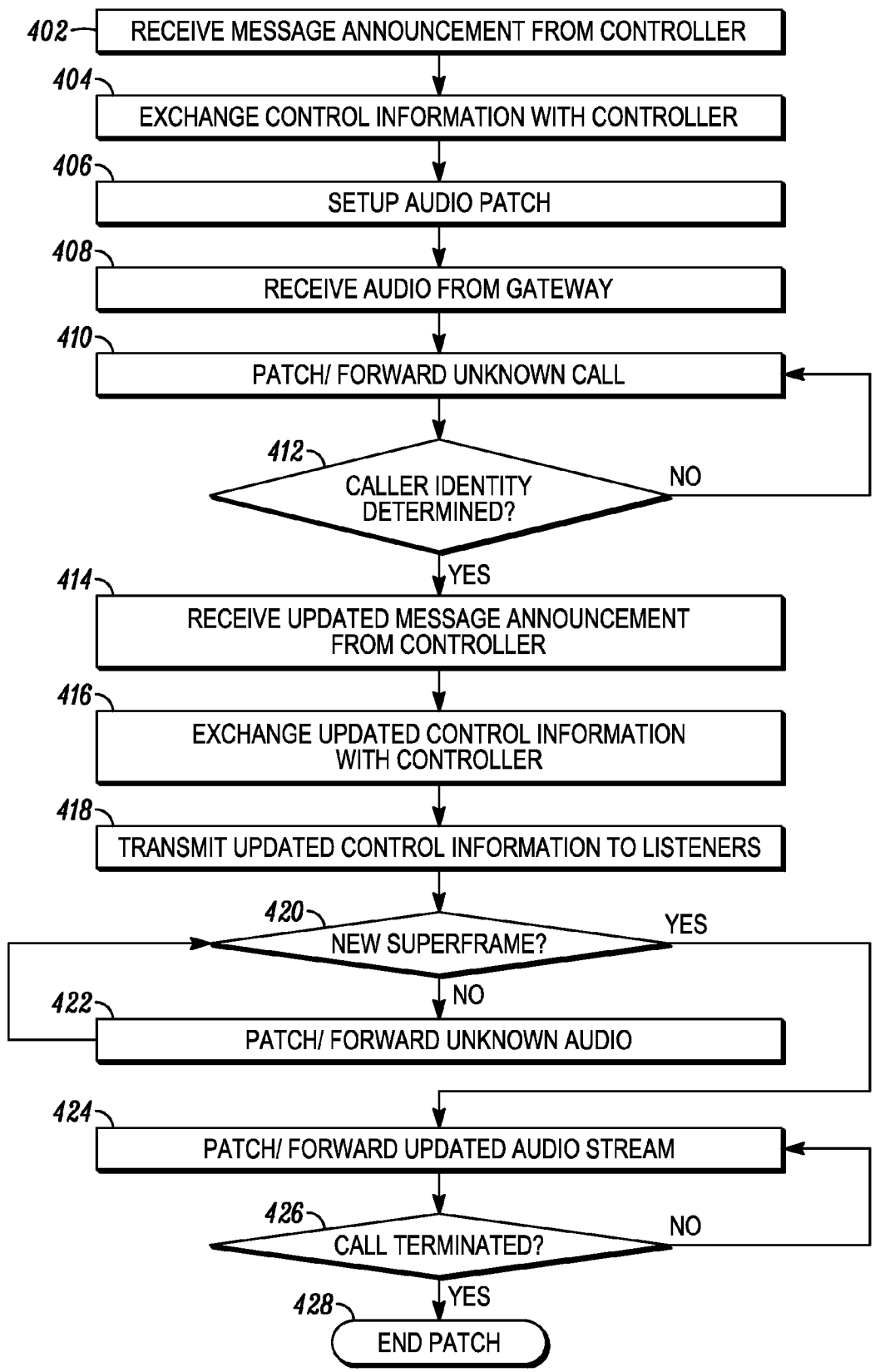
FIG. 4 illustrates a flow chart of a method used by a console for providing transmitter identity in a patched communication.

One embodiment of the method of providing updated transmitter identity is illustrated in the flowcharts of FIGS. 3 and 4. The flow chart of FIG. 3 illustrates the gateway and controller functions, while the flow chart of FIG. 4 illustrates the console functions. The gateway receives a call at step 301. The call is initiated by the transmitter and audio is sent to the gateway by means of the base station. The gateway obtains the control information from the header at step 302 and exchanges control messages (requests and grants) with the controller at step 304. The controller sends control information to the console at step 306. Concurrently, the gateway continues to receive audio from the base station at step 308, stores the audio at step 310, and forwards the audio to the console at step 312. Because the caller identity has not yet been decoded, no device receiving either control information or audio is able to match the call to the transmitter.

The gateway continues storing audio frames until all of the frames containing the embedded identity information (frames containing LC1) are stored at step 314. Once all of these frames are stored, the gateway extracts the control information embedded in the audio and decodes this information, obtaining the transmitter identity at step 316. The gateway then updates the control information with the transmitter identity at step 318 and exchanges updated control messages (requests and grants) with the controller at step 320. Each updated control message contains the transmitter identity. The audio frames stored in the gateway are discarded at step 322 and the audio continues to be provided to the console at step 324 until the call terminates at step 326.

Turning to FIG. 4, the console receives an announcement from the controller at step 402 indicating that a call is starting. Because other channels or talkgroups are patched to this call, the console exchanges control messages (requests and grants) with the controller at step 404 and proceeds to set up the audio patch at step 406, sending the control information to the devices on the various channels that are to receive the audio and/or control information of the call. The console receives audio from the gateway at step 408 and patches the audio to the various devices at step 410. As indicated above, because the caller identity has not yet been decoded, the messages contain a transmitter identity field whose value is unknown and thus no device receiving either control information or audio is as yet able to match the call to a transmitter at this point.

This continues until the embedded control information is extracted and decoded by the gateway, thereby determining the caller identity at step 412. The console receives an updated announcement from the controller at step 414 indicating that the call, already started, has control changes. The console exchanges control messages (requests and grants) with the controller at step 416, these messages now containing the transmitter identity. The console at step 418 also shortly thereafter (e.g., immediately after receiving and decoding the last of the frames containing the transmitter identity) provides the updated console control messages to non-listeners that would otherwise not be provided updated console control messages except to maintain the call. Thus, the updated console control messages are provided substantially prior to the time established for the periodic console control message to the non-listeners. Although the console has been provided the transmitter identity at this point, due to the protocols used, the console continues at step 420 to receive and patch the audio at step 422 until a new superframe is to be provided at step 420. Once the new superframe has started for the patched channels and/or talkgroups, the console provides the audio as well as the identity to the receivers at step 424 until the call terminates at step 426, at which point the console ends the patch at step 428.

Figure 5B:
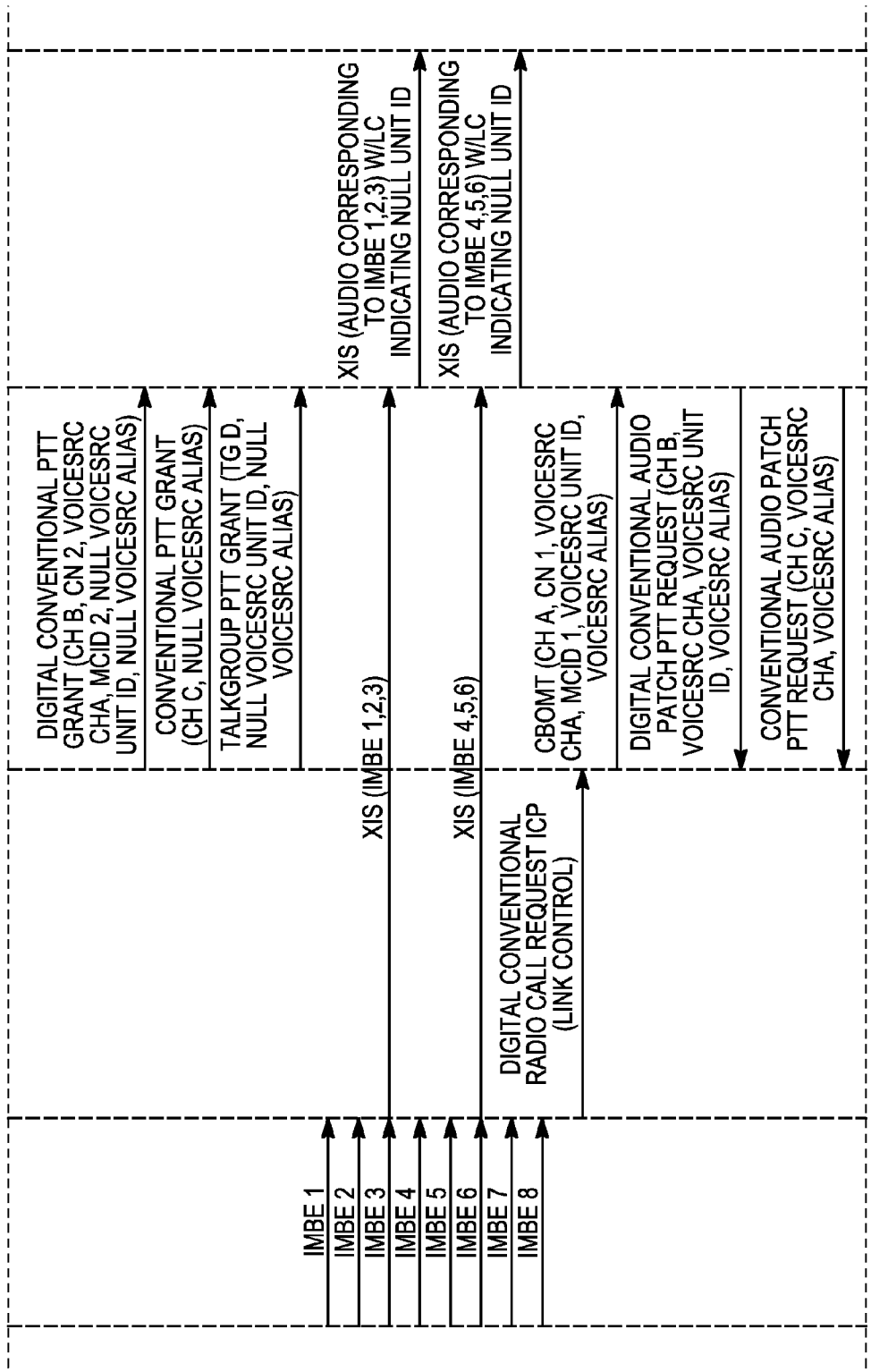
FIG. 5 illustrates various messages exchanged when patching a call.
Figure 5C:
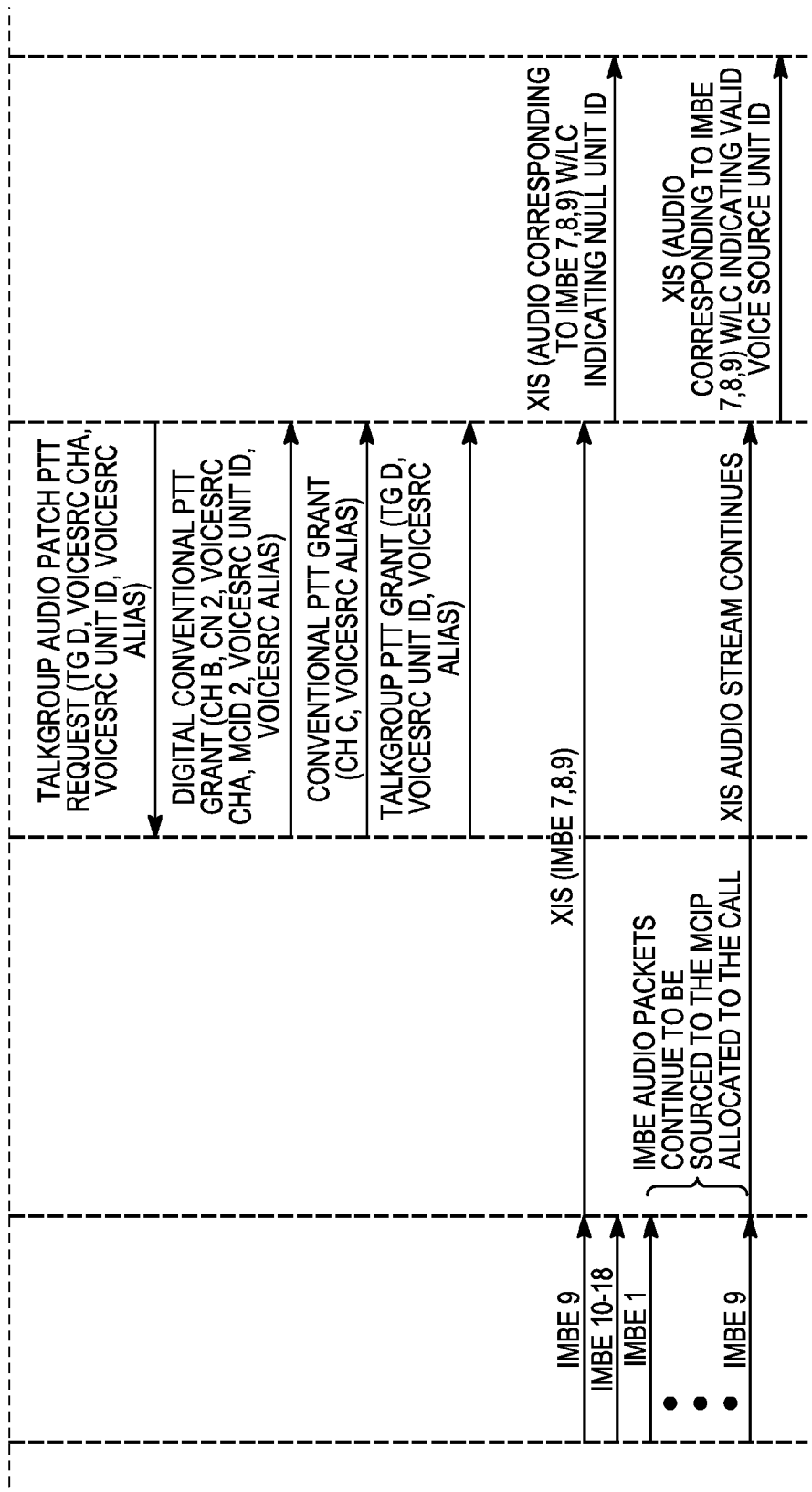

Referring to FIG. 5, one embodiment of control messages among the gateway, controller, and console are shown. In FIG. 5, the header is formed by two voice header portions VHDR 1, 2 and the audio frames of the superframe are called IMBE (Improved Multi-Band Excitation) frames in CAI P25 standard protocol. Prior to receiving these messages, in an embodiment in which there are no frame errors and nor is there late entry into tracking the superframe, the gateway receives and processes APCO-modulated digital data from the base station. The gateway provides a Digital Conventional Radio Call Request (inbound control packet ICP) that contains the channel identifier (channel URID) and the frequency used. In one embodiment (such as that using Motorola ASTRO®) when using IMBE frames, the gateway may need to only decode a PID/FT (Protocol Identifier/Frame Type) of the first received frame to determine that the decoded PID/FT is of an IMBE frame (and therefore this is a digital mode call). The gateway sends a "call started" message to the controller knowing only the modulation of the call (i.e. digital), requesting acknowledgement by the controller.

The gateway receives a call start grant message from the controller. The grant message is shown in FIG. 5 as a Conventional Radio Call Grant (outbound control packet OCP) and containing the associated ID and multicast IP address (assoc ID, MCIP). The gateway continues to receive header portions VHDR 1, 2 and IMBE frames from the base station. The gateway buffers the IMBE frames, preserving a 60 ms boundary between outgoing packets (to the console) by inserting silence if one or more of the IMBE frames in a set of three packaged frames of the outbound packet is missing or corrupted. Upon receiving the call start grant from the controller, the gateway sends hello messages at intervals of 20-30 ms to the multicast IP address and starts a packet holdoff timer. When the timer expires, the gateway begins sending non-hello (VHDR, IMBE) packets to the multicast IP address. Three IMBE frames are packaged into a packet and sent to the multicast IP address.

The controller also sends a control message to the console. The control message is a Conventional Beginning of Mobile Transmit message (CBOMT) whose fields include the channel, call number, Multicast IP address (MCID—MultiCast Identifier), voice source (channel on which the transmitter audio stream is going to be sent), voice source (transmitter) identity, and voice source alias. For example, the identity may be the name of the user or a unique numerical identifier of the device or user and the alias may be a command group to which the user belongs. The alias may be used instead of, or in addition to, the transmitter identity when displayed or stored by the receivers or listeners. Initially, both the transmitter identity and the alias of the transmitter are unknown (as they are obtained from the control information embedded in the IMBE frames), and thus these fields are filled by NULL.

After receipt and processing of the CBOMT message from the controller, the console and gateway are able to communicate using the multicast IP address. In the embodiment shown, the controller and gateway communicate using ASTRO® conventional call active protocol packets. The console also requests allocation of various channels from the controller for various types of connections. These requests as shown include channels for a conventional digital audio transmission (Digital Conventional Audio Patch PTT Request), a conventional analog audio transmission (Conventional Audio Patch PTT Request), and a talkgroup (Talkgroup Audio Patch PTT Request). Each of these requests contains the particular desired channel (as illustrated, digital—channel B, analog—channel C, talkgroup—channel D), the source channel of the audio, the identification of the transmitter, and the alias of the transmitter.

In response to these requests, the controller sends the various grants to the console confirming the desired channels. The digital grant (Digital Conventional PTT Grant) contains the digital channel (B), the call number (2), the channel of the voice source (channel A), the multicast address (2), and transmitter identity and alias (NULLs for now). The analog grant (Conventional PTT Grant) contains the analog channel (C) and the alias (NULL). The talkgroup patch (Talkgroup PTT Grant) contains the talkgroup channel (D) and the transmitter identity and alias (NULLs).

At this point, the audio patch is activated and the received audio on CH A (XIS packets for IMBE frames 1,2,3 and 4,5,6) received at the console is routed to the audio patch destinations (CH B, CH C and CH D). However, the Unit ID of the transmitter has not been relayed as the console is still waiting for this information.

To obtain many of the attributes of the call (with the exception of unit ID which exist only in embedded link control LC1 of the IMBE frames), the gateway performs decoding, e.g., Reed-Solomon decoding, on the control information in the header. As the IMBE frames arrive at the gateway, they are decoded to provide the embedded link control information. In a late entry scenario in which the base station receives and forwards only a portion of the superframe to the gateway, the gateway accumulates the call attributes from the embedded link control information because there is no header. In this scenario, the gateway acts similar to the above, with the exception that the gateway inserts frames of silence for missed frames (to preserve the 60 ms boundaries). As above, depending on where the system picked up the audio stream, the determination of the identity of the transmitter could take up to the superframe length (360 ms)+six frames (120 ms)+ processing time=about 0.5 s.

Turning back to the diagram of FIG. 5, the link control information from the audio is decoded and accumulated at the gateway. After IMBE frame 8 is processed by the gateway the transmitter identity is able to be determined. After the transmitter identity is determined, it is sent by the gateway as a zone control ICP update to the controller. The controller responds by sending an updated CBOMT to the console containing the same information as the original CBMOT, but also including the transmitter identity/alias (and other information contained in the link control fields) rather than the original NULL.

The console responds to this updated CBOMT with requests to the controller and the controller responds with associated grants. The requests and grants are similar to the original requests and grants above, but now contain the transmitter identity/alias. While it is desirable to instantly change the link control fields of the audio layer to now include the valid transmitter Unit ID instead of a NULL Unit ID, this does not take effect until the next superframe. Thus, transmitter identity/alias is relayed to the devices on the various channels via the call control layer. The IMBE audio packets continue to be sourced by the gateway to the multicast IP address allocated to the call, where they are patched to the desired addresses.

All of this occurs seamlessly in real time so that, to the users of the receivers, the identity appears shortly after audio is received. In most circumstances, if it takes under about 0.5 s for this information to be provided, the users may not even be aware that the transmitter identity and alias were not initially available. This information may thus be somewhat more important to automated devices that track the calls and identities of the callers than to users themselves. The second digital "call started" message permits the call information (including the transmitter identity) to be updated.

On the other hand, an update to the control messages for other devices is initiated as soon as possible (which, although contains a slight delay for processing and perhaps negotiation of the channel, has been referred to herein as immediately) rather than waiting the standard time for repetition to maintain the call. Thus, the control message is transmitted between the conventional standard-established control messages (indicating that the call remains alive) and is supplementary to these standard control messages.

Note that, in FIG. 5, all of the updated control messages are transmitted from the gateway prior to IMBE frame 9 being received by the gateway or the packet containing IMBE frames 7-9 is sent by the gateway to the console. This timing, however, may change dependent on the speed of the processor in the gateway. In other embodiments, the updated control messages transmitted from the gateway may occur after IMBE frame 9 is received by the gateway or the packet containing IMBE frames 7-9 is sent by the gateway to the console. While it is generally desirable to update the various control messages as soon as possible, in some situations, the resources of the gateway, controller and/or console may be more desirably engaged elsewhere at first. In this case, the updated control messages may be transmitted at any point, although it is generally preferable to complete the transmissions prior to the next superframe being transmitted to the target devices.

Table 1, below, shows one example of the timing of a conventional digital CAI P25 message. In the table, as indicated previously, VHDR 1 and 2 are the two voice header portions that form the header and IMBE 1-18 are the frames of the superframe containing audio and embedded control information. In addition, the various acronyms include: ICW—Infrastructure Control Word; MI—Message Indicator; MFID—Manufacturer's Identifier; ALGID/KID Algorithm/Key Identifier (for the encryption algorithm); TGID—Talkgroup Identifier (if used); LC—Link Control; LCF—Link Control Format; ESYNC—Encryption Synchronization (IMBE frames 12-17).

TABLE 1

| | Message Length | Total Elapsed Time (first byte of VHDR1 to last byte of the frame) | Total Elapsed Time (first byte of IMBE1 to last byte of the frame) |
|---|---|---|---|
| (units in sec) | | | |
| VHDR1 (ICW) | 0.027392 | 0.027392 | |
| VHDR2 (MI, MFID, ALGID, KID, TGID) | 0.020608 | 0.065716 | |
| IMBE1 (ICW) | 0.021017 | 0.102784 | 0.021017 |
| IMBE2 | 0.014336 | 0.11986 | 0.038093 |
| IMBE3 (LCF, MFID) | 0.016947 | 0.139546 | 0.057779 |
| IMBE4 (TGID) | 0.016845 | 0.15913 | 0.077363 |
| IMBE5 (UNIT ID) | 0.01646 | 0.178304 | 0.096537 |
| IMBE6 | 0.017459 | 0.198503 | 0.116736 |
| IMBE7 | 0.016742 | 0.217984 | 0.136217 |
| IMBE8 | 0.017012 | 0.241064 | 0.159297 |
| IMBE9 | 0.016 | 0.259738 | 0.177971 |
| IMBE10 (ICW) | 0.020813 | 0.28329 | 0.201523 |
| IMBE11 | 0.014029 | 0.300058 | 0.218291 |
| IMBE12 (MI) | 0.016654 | 0.319451 | 0.237684 |

TABLE 1-continued

| | Message Length | Total Elapsed Time (first byte of VHDR1 to last byte of the frame) | Total Elapsed Time (first byte of IMBE1 to last byte of the frame) |
|---|---|---|---|
| (units in sec) | | | |
| IMBE13 (MI) | 0.016512 | 0.338703 | 0.256936 |
| IMBE14 (MI) | 0.01664 | 0.358082 | 0.276315 |
| IMBE15 (ALGID/KID) | 0.016435 | 0.377256 | 0.295489 |
| IMBE16 | 0.016438 | 0.399861 | 0.318094 |
| IMBE17 | 0.016435 | 0.41901 | 0.337243 |
| IMBE18 | 0.016026 | 0.437775 | 0.356008 |
| Link Control | | 0.065716 | |
| | | 0.017716 | |
| ESYNC | | 0.241064 | |

As above, although the console, controller, and gateway are separated in FIG. 1, the functionality of one or more of these can be combined in a single unit so that at least two (or all three) of the console, controller, and gateway are modules in one device in the infrastructure. For example, the console can be intelligent and request from the controller particular channels for particular types of communication for the patch or the console can essentially be a slave of the controller, receiving commands indicating on which channels to transmit and what type of data to transmit on these channels.

Thus, in various embodiments, a method of patching a push-to-talk (PTT) call from a transmitter to a plurality of target devices is provided. In the method, a non-trunked audio stream of the PTT call is provided to a communication infrastructure, the audio stream is provided (i.e. patched) to a plurality of outgoing audio streams to receivers through an audio patch, the identity and/or alias of the transmitter is extracted using control information embedded in the audio stream, and the identity/alias is relayed to the receivers without delaying delivery of the outgoing audio streams while the identity/alias is being extracted. The delay in providing the audio stream is minimized to enable the audio stream to be patched in Mission Critical situations. In addition, control messages are provided to non-listeners. The control messages are transmitted periodically according to a predetermined schedule to maintain the call. The control message initially provided with the call lacks both the identity and alias, while the updated control information contains the extracted identity/alias. After the extraction and decoding of the identity/alias, rather than waiting until the next periodically-scheduled transmission, the updated control message is provided immediately (i.e., prior to the next periodically-scheduled control message). The audio stream uses a conventional CAI P25 protocol while the outgoing audio streams to the receivers use a plurality of protocols, at least some of which may be different from the audio stream protocol.

Note that the inbound audio stream may not merely be patched to the receivers, as is, since the receivers may be using different protocols and, when using the same protocol (e.g., IMBE frames) the IMBE frames do not simply pass through the console. Transmitter superframes are not aligned in real time with the beginning of a superframe expected by the receiver—they are asynchronous. Attempting some form of alignment would contribute to the delay and thus exacerbate the transmitter identity problem described.

It will be understood that the terms and expressions used herein have the ordinary meaning as is accorded to such terms and expressions with respect to their corresponding respective areas of inquiry and study except where specific meanings otherwise have been set forth herein. Relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments are implemented as entirely hardware, or entirely software (e.g., a computer program product).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention defined by any claims issuing herefrom, and that such modifications, alterations, and combinations are to be viewed as being within the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the issuing claims. The invention is defined solely by the issuing claims including any amendments made and all equivalents of those claims.

The invention claimed is:

1. A method of patching a push-to-talk (PTT) call from a first mobile radio to a plurality of mobile radio, the method comprising:
   receiving by a server, a non-trunked digital audio stream from the first mobile radio;
   providing to the multiple mobile radios, by the server, the digital audio stream through an audio patch without providing an identity or alias of the first mobile radio to the multiple mobile radios;
   extracting, by the server, at least one of the identity or alias of the first mobile radio;
   providing to the multiple mobile radios, by the server after the step of extracting, the audio stream through an audio patch along with the identity or alias of the first mobile radio;
   providing control plane information of the call to non-listeners without providing the non-listeners with the audio stream, the control plane information having periodically-scheduled updates to maintain the call, initial control plane information provided to the non-listeners lacking both the identity and alias of the transmitter;
   updating the control plane information to contain the extracted at least one of the identity or alias of the first mobile radio; and
   providing the updated control plane information to the non-listeners prior to the next periodically-scheduled update.

2. The method of claim 1, wherein the audio stream is provided in superframes each containing frames, at least one of the output audio streams is provided in packets each containing a group of frames in which multiple groups of frames form one superframe, the at least one of the identity or alias being provided to the multiple mobile radios prior to packets of the second complete superframe received being provided to the multiple mobile radios.

3. The method of claim 1, wherein control information is embedded in the audio stream.

4. The method of claim 3, wherein the audio stream from the first mobile radio employs a conventional CAI APCO P25 protocol and the outgoing audio streams to the multiple mobile radios employ a plurality of protocols.

5. The method of claim 1, wherein a protocol of the audio stream to the multiple mobile radios is different from a protocol of the audio stream received from the first mobile radio.

6. The method of claim 1, wherein the call comprises the audio stream and a header that contains control information, the at least one of the identity or alias of the first mobile radio provided in the audio stream but not the header.

7. A server comprising:
receiver circuitry configured to receive from a first mobile radio, a push-to-talk (PTT) non-trunked digital call containing an audio stream; and
a processor configured to extract at least one of an identity or alias of the first mobile radio using control information of the call;
transmitter circuitry configured to provide the audio stream to multiple mobile radios through an audio patch without providing an identity of the first mobile radio prior to the identity being extracted and to provide the audio stream to multiple mobile radios through an audio patch containing the identity of the first mobile radio after being extracted;
the receiver circuitry is further configured to receive:
an initial control message associated with the audio stream and that does not contain the at least one of the identity or alias, the initial control message initiating the audio patch, and
an updated control message associated with the audio stream and that contains the extracted at least one of the identity or alias, the updated control message updating the initial control message; and
the transmitter circuitry is further configured to:
periodically retransmit control messages to maintain the call, and transmit an updated console control message containing the extracted at least one of the identity or alias prior to the next periodic retransmission of the initial control message.

8. The server of claim 7, wherein the audio stream is received in superframes, the updated control message being transmitted prior to the second complete superframe being received.

9. The server of claim 7, wherein the control information is embedded in the audio stream.

10. The server of claim 9, wherein the audio stream uses a conventional CAI APCO Project 25 protocol and the outgoing audio streams use a plurality of protocols.

* * * * *